United States Patent [19]

Carson et al.

[11] Patent Number: 5,800,182
[45] Date of Patent: Sep. 1, 1998

[54] FABRIC CHART KIT

[75] Inventors: Stephen T. Carson; Patricia L. Carson; Janet B. Dellosa, all of Greensboro, N.C.

[73] Assignee: Carson-Dellosa Publishing Company, Inc., Greensboro, N.C.

[21] Appl. No.: 660,495

[22] Filed: Jun. 7, 1996

[51] Int. Cl.$^6$ .................................................. G09B 29/00
[52] U.S. Cl. ............................................................ 434/430
[58] Field of Search .................................................. 434/430

[56] References Cited

U.S. PATENT DOCUMENTS

| | | | |
|---|---|---|---|
| 2,914,873 | 12/1959 | Brennan | 434/430 X |
| 3,077,041 | 2/1963 | Larson | 434/430 |
| 4,373,917 | 2/1983 | Jackson | 434/209 |
| 5,259,763 | 11/1993 | Wendel et al. | 434/150 |

FOREIGN PATENT DOCUMENTS

| | | | |
|---|---|---|---|
| 842480 | 7/1960 | United Kingdom | 434/430 |
| 2052826 | 1/1981 | United Kingdom | 434/430 |

OTHER PUBLICATIONS

ABC School Supply Catalog, 1996 edition, pp. 115, 339, 340, 362.

*Primary Examiner*—Jeffrey A. Smith
*Attorney, Agent, or Firm*—Rhodes Coats & Bennett, L.L.P.

[57] ABSTRACT

An interactive teaching aid. The teaching aid includes a fabric or plastic panel having a binding attached around the outer edges of the structure for providing structural integrity; a plurality of hangers for permitting the panel to be hung on a wall or stand; and panel indicia on at least one surface of the panel. The teaching aid also includes removable relational manipulative elements for attaching to the panel, the relational manipulative elements including element indicia related to the panel indicia.

11 Claims, 3 Drawing Sheets

FABRIC CHART KIT

BACKGROUND OF THE INVENTION

(1) Field of the Invention

The present invention relates generally to interactive teaching aids and, more particularly, to a fabric chart kit containing a fabric panel and easily removed related manipulative elements for teaching a variety of educational concepts.

(2) Description of the Prior Art

Various educational resources for teaching school-age children basic skills are currently in use. For example, flash cards which display numbers, alphabets, and words are one source commonly used to teach classes, small groups or individuals. Books, posters and bulletin boards are other teaching aids that are typically used to develop childrens' math, language and other skills. While a variety of techniques are available to reinforce educational concepts, the idea of the child interacting with the learning resource is instrumental in strengthening the skills that are being developed.

One teaching aid teachers use is to display a flannel fabric panel on a bulletin board or the like and then to place onto the flannel decorative flannel pieces or flannel pieces selected by the teacher. However, in this case, the flannel fabric panel simply serves as a background color and is not related to the information placed on it.

Another teaching aid teachers use is a magnetic bulletin board onto which they position various magnetic objects selected by the teacher such as the letters of the alphabet. However, like the flannel fabric panel, the magnetic bulletin board simply serves as a background color and is not related to the information on it.

Thus, there remains a need for a new and improved interactive teaching aid which includes information useful for teaching educational concepts and provides a means for easily attaching and arranging objects related to the teaching information while, at the same time, is easily stored when not in use.

SUMMARY OF THE INVENTION

The present invention is directed to an interactive teaching aid which includes a panel, indicia on at least one surface of the panel and a plurality of easily removed relational manipulative elements.

In the preferred embodiment, the panel is formed from a material of the type which allows easy cleaning of its surface with a damp sponge and mild detergent such as a flannel fabric or plastic sheet. In addition, the panel may be rolled up and conveniently stored upon completion of the learning activity. Also, in the preferred embodiment, the panel includes a binding sewn around the outer edges of the entire panel to provide structural integrity to the panel. The panel also may include a weighted lower edge to help the fabric panel remain in a open and flat position during use.

The present invention is designed to reinforce educational basic skills in a variety of educational areas including, but not limited to, math, language, and geography. The teaching aid is designed to teach skills in these areas by allowing the participants to interact with the aid. In this regard, indicia on the panel may include, among other things, graphs, grids, number lines, clocks, people, animals, plants, maps, shapes and buildings.

If, for example, the indicia of the panel was a map of the United States, the participant interacts with the map by attaching the manipulative element which bears some relationship to a particular area on the panel. So, in an exercise to learn the capitals of the fifty states, the child would select the element or card which represents the capital city for a given state and then attach the card to the area of the panel for that state. The map also could be used to teach a child directions, bodies of water, mountain ranges, among other things.

Similarly, another panel may include the face of a clock for teaching time, wherein the child attaches elements or cards which bear some relationship to the clock and various parts thereof. Another panel may represent a graph or grid on which graphing activities may be charted, for example, favorite fruits, sports, pets, eye color and much more.

Accordingly, one aspect of the present invention is to provide an interactive teaching aid. The teaching aid includes: (a) a panel; and (b) panel indicia on at least one surface of the panel.

Another aspect of the present invention is to provide a teaching aid. The teaching aid includes: (a) a flexible planar structure; (b) binding attached around the outer edges of the structure for providing structural integrity; and (c) a plurality of hanging members for permitting the teaching aid to be hung on a wall or stand.

Still another aspect of the present invention is to provide an interactive teaching aid. The teaching aid includes: (a) a panel, the panel including: (i) a flexible planar structure; (ii) binding attached around the outer edges of the structure for providing structural integrity; and (iii) a plurality of hanging members for permitting the panel aid to be hung on a wall or stand; (b) panel indicia on at least one surface of the panel; and (c) removable relational manipulative elements for attaching to the panel, the relational manipulative elements including element indicia related to the panel indicia.

These and other aspects of the present invention will become apparent to those skilled in the art after a reading of the following description of the preferred embodiment when considered with the drawings.

DESCRIPTION OF THE PREFERRED EMBODIMENTS

Figure 1:
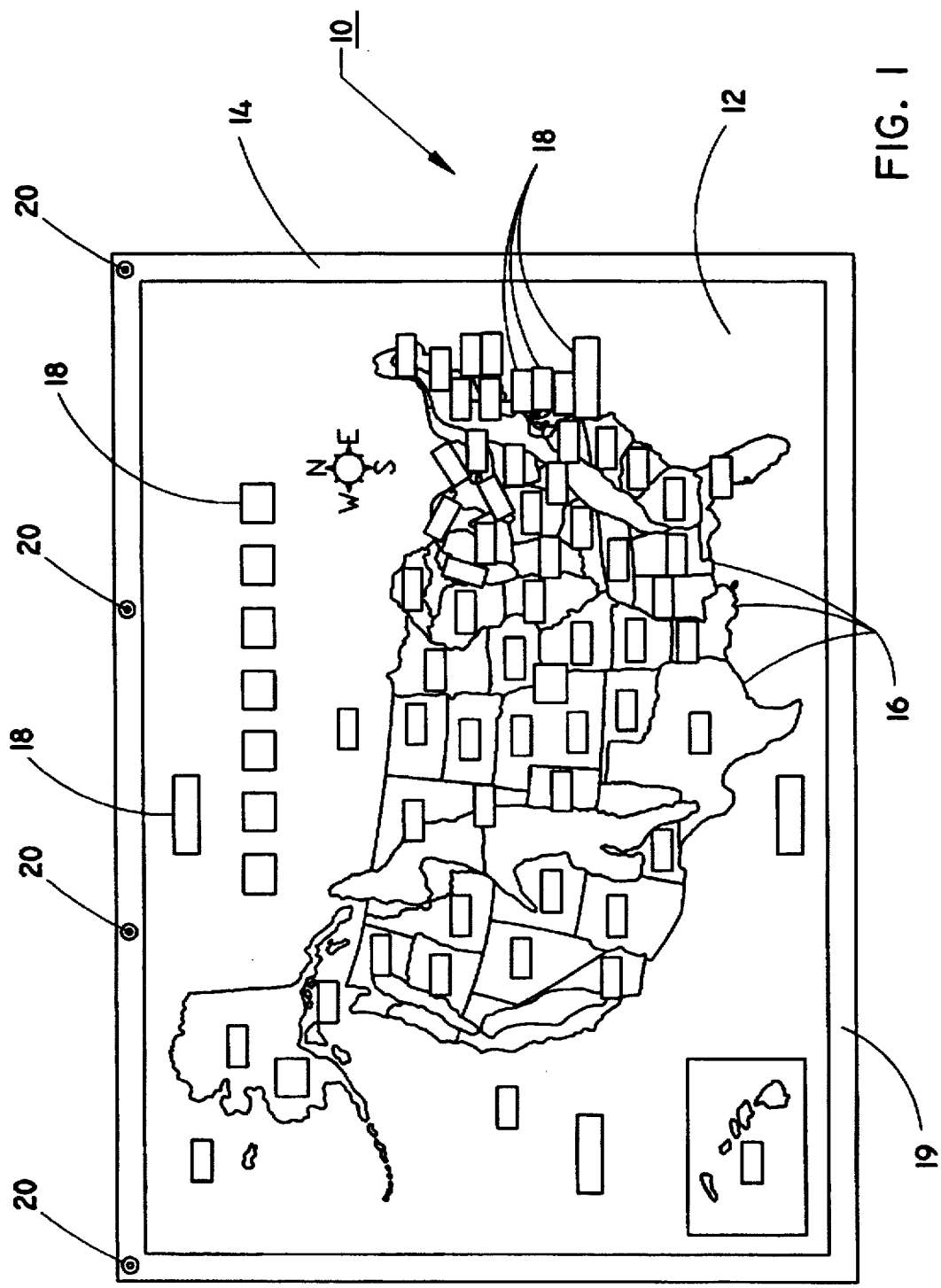
FIG. 1 is a front view of an interactive teaching aid fabric chart kit constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, an interactive teaching aid, generally designated 10, is shown constructed according to the present invention. The teaching aid 10 includes three major subassemblies: a panel 12; indicia 16 which is permanently affixed to at least one surface of panel 12; and a plurality of relational manipulative elements 18 which may be removably attached by a variety of means to the panel 12.

In the preferred embodiment, panel 12 is formed from material of the type that is easily cleaned, for example, with a sponge and mild detergent, such as a flannel fabric or plastic sheet. Also, the panel may include a binding 14 sewn around the outer edges of the entire panel to provide structural integrity to the panel. The panel also may include a weighted lower edge 19 to help the fabric panel remain in a open and flat position during use.

For displaying purposes, the panel 12 includes a plurality of hanging members 20, for example, grommets and hooks, which allow the panel 12 to be easily hung up and used. The hooks may be push pins, magnet hooks, picture hangers, suction cup hooks or the like. Hanging members 20 are typically positioned along the top portion of fabric panel 12.

Although panel indicia 16 in FIG. 1 represents the United States map, this is but one illustration of the type of panel indicia 16 which is contemplated by the present invention. For example, panel indicia 16 may comprise a clock for teaching time, graphs and grids which are used to graph items like favorite fruits, pets, eye color, and favorite sports, number lines for teaching mathematical skills, a piggy bank to teach currency and math skills, and a world map which is used to teach the geography of continents, oceans, mountain ranges, latitude, longitude and valuable resources and the like.

Figure 3:
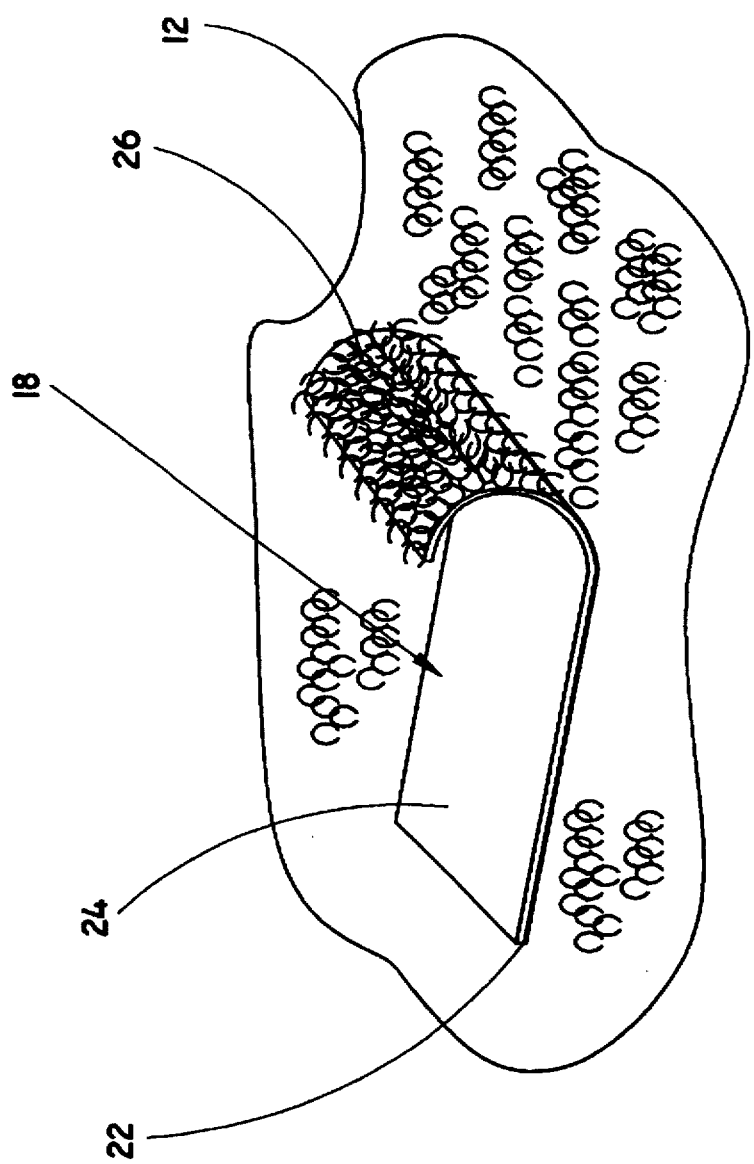
FIG. 3 is a partial perspective view of an removable relational manipulative element for use with the fabric chart showing one means for attaching the element to the fabric panel.

Interactive teaching aid 10 reinforces educational concepts by allowing the participant to interact with the kit using the relational manipulative elements 18. As shown in FIG. 3, in the preferred embodiment, the relational manipulative elements 18 include a backing or support member 22 and indicia 24 which bear a relationship to other manipulative elements 18 and to the fabric panel 12. Element 18 is secured to the fabric panel 12 by an attachment member 26.

FIG. 3 also illustrates one type of attachment member 26, the hook-and-loop fastener well known by the trademark Velcro®. The hook component of the fastener may be permanently secured to the rear side of element 18 or, in the alternative, the hook component may be used in the form of a roll of hook tape, which may be cut into individual sections and then secured to element 18. It is contemplated that other attachment members 26 may be used, for example, low tack adhesives or even fabric.

The relational manipulative elements 18 come in a variety of shapes, colors, words, numbers and animals. Elements 18 bear some type of relationship to each other and to the fabric panel 12 to which they are attached. For example, using a United States map on panel 12, elements 18 include names of the fifty states, their capitals, mountain ranges, bodies of water, resources, etc. In an interactive teaching aid 10 having a piggy bank as the panel indicia 16, elements 18 may include words representing the different United States coins as well as representations of the coins themselves, for example, a quarter, dime, penny.

Figure 2:
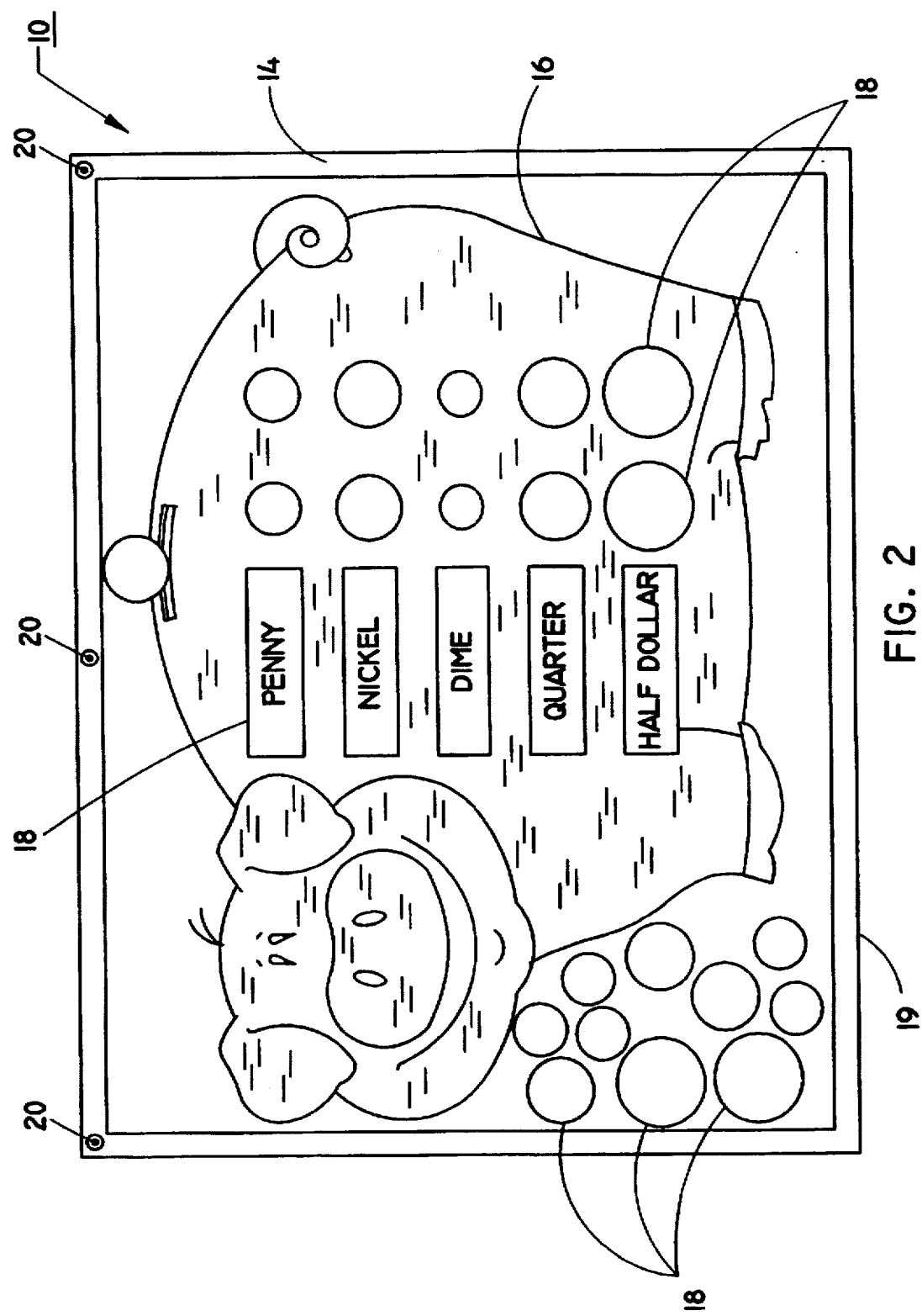
FIG. 2 is a front view of an alternative embodiment of the fabric chart kit.

The interactive aspect of the present invention allows each participant to attach, arrange or remove an element 18 onto the corresponding relative position on panel 12. For example, for a United States map as shown in FIG. 1, each element represented by a state capital may be matched to its corresponding state which is shown on fabric panel 12. As illustrated in FIG. 2, elements 18 which represent coin words are matched with the corresponding U.S. coin or panel indicia 16 on fabric panel 12. Each element 18 is attachable by a member 26 and is easily removed. Each interactive teaching aid 10 may be customized to fit the educational needs of a particular class, group or individual.

In the preferred embodiment, panel 12 is not rigid and, at the completion of the instructional activity, panel 12 may be rolled up and easily stored.

Certain modifications and improvements will occur to those skilled in the art upon a reading of the foregoing description. By way of example, four color indicia could be printed onto the panel. Also, while the panel has been shown with indicia only on one side, the panel could be reversible and include indicia on the opposite side also, such as both maps of the world and the United States. It should be understood that all such modifications and improvements have been deleted herein for the sake of conciseness and readability but are properly within the scope of the following claims.

We claim:

1. An interactive teaching aid, comprising:
   (a) a non-magnetic panel, said panel including:
      (i) a flexible flannel fabric planar structure; (ii) a flexible binding attached around the outer edges of said structure for providing structural integrity; (iii) a plurality of hanging members for permitting said panel to be hung on a wall or stand; and (iv) wherein a portion of the lower edge of said binding is weighted;
   (b) panel indicia on the front surface of said panel; and
   (c) non-magnetic relational manipulative elements removably attachable to said panel, said relational manipulative elements including element indicia related to said panel indicia.

2. The teaching aid according to claim 1, wherein said removable relational manipulative elements include indicia related to one another.

3. The teaching aid according to claim 1, wherein said relational manipulative elements each include a backing and means for removably attaching said backing to said panel.

4. The teaching aid according to claim 1, wherein said element indicia is on said backing.

5. The teaching aid according to claim 3, wherein said means for removably attaching said backing to said panel is a two-part hook and loop fastener system having one part attached to said backing and the other part attached to said panel.

6. The teaching aid according to claim 3, wherein said means for removably attaching said backing to said panel is a low tack adhesive.

7. The teaching aid according to claim 1, wherein said panel indicia is selected from the group consisting of maps, graphs, grids, and number lines.

8. The teaching aid according to claim 1, wherein said element indicia is selected from the group consisting of coins, words, numbers, shapes, figures, symbols and colors.

9. The teaching aid according to claim 1, wherein said hanging members include grommets located in said binding and hooks adapted to be attached to a wall or stand for receiving said grommets.

10. The teaching aid according to claim 9, wherein said hooks are selected from the group consisting of push pins, magnet hooks, picture hangers and suction cup hooks.

11. The teaching aid according to claim 1, wherein said panel indicia is selected from the group consisting of clock faces, people, animals, plants, shapes, buildings and vehicles.

* * * * *